United States Patent [19]

Gopal et al.

[11] 3,818,231
[45] June 18, 1974

[54] N-16 NUCLEAR REACTOR COOLANT FLOW RATE MEASURING SYSTEM

[75] Inventors: Raj Gopal, Monroeville, Pa.; Harald H. Weiss, Vienna, Austria

[73] Assignee: Westinghouse Electric Corporation, Pittsburgh, Pa.

[22] Filed: July 20, 1971

[21] Appl. No.: 164,393

[52] U.S. Cl. .................................. 250/356, 176/19
[51] Int. Cl. .......................................... G01n 23/12
[58] Field of Search................. 250/43.5 FC; 176/19

[56] References Cited
UNITED STATES PATENTS
3,239,663   3/1966   Oshry et al. ................. 250/43.5 FC Primary Examiner—James W. Lawrence
Assistant Examiner—Davis L. Willis
Attorney, Agent, or Firm—D. C. Abeles

[57] ABSTRACT

A method and apparatus is disclosed for measuring the primary coolant flow rate in the coolant loops of a nuclear reactor which utilizes the statistical variation of the N-16 activity in the coolant water. The flow rate is calculated based upon knowing the distance between two N-16 detectors positioned along the reactor coolant loops and determining the time which elapses for an activity pattern to travel from one detector to a second detector positioned downstream.

8 Claims, 5 Drawing Figures

AN N-16 NUCLEAR REACTOR COOLANT FLOW RATE MEASURING SYSTEM

BACKGROUND OF THE INVENTION

This invention pertains in general to a system for measuring the rate of flow of coolant in a nuclear reactor coolant loop and more particularly to such a system which utilizes the N-16 activity in the coolant for flow measuring purposes.

The present flow measuring systems employed to measure the flow in nuclear reactor coolant loops utilize the pressure drop across an elbow or other flow obstructing structure in the coolant loop. However, with increasing cross section of the coolant pipes such measurements become more and more inaccurate and unreliable due to stratifications and non-uniformity of the flow pattern.

In addition, other systems have been employed which utilize the decay of N-16 activity present in the coolant loop to determine the flow rate. Such flow monitors have employed two N-16 detectors, A and B, spaced along the coolant pipe. The detectors respond to the N-16 activity as the coolant traverses the pipe between the detector locations. The downstream detector B will read less than the upstream detector A, due to the decay of the N-16 activity as the water progresses between detector locations. With decreasing flow, the relative difference between readings increases. The ratio of these readings is given generally by the following equation:

reading $a$/reading $B = e^{\tau(t_B - t_A)}$; where both detectors have the same sensitivity. $t_A$, $t_B$ are the transport times of the coolant from the core to the detector positions. $\tau$ is the decay constant of N-16. The flow rate can then be determined from the time difference $t_B - t_A$. Such measuring systems have the disadvantage that the available distance between the N-16 detectors is limited to a few feet on the hot leg of the coolant loop. Thus, the difference between the two detector readings is in the order of 1 percent. Therefore, highly stable, sensitive, accurate detecting instruments have to be used. Furthermore, the noise from the N-16 signal is in the order of a few percent which complicates the ratio measurement considerably.

Thus, it is the object of this invention to provide apparatus that will more accurately determine the flow rate of the coolant in a nuclear reactor coolant loop.

It is a further object of this invention to provide such apparatus that will employ the N-16 activity in the coolant loop for making such flow rate determinations.

SUMMARY OF THE INVENTION

The flow rate monitor contemplated by this invention employs two N-16 detectors spaced at a known distance along the reactor coolant loop pipe. Both detector signals consist of a DC component and a superimposed noise AC component. The AC component is due to local variations in the N-16 activity concentration in the coolant fluid and some stray noise associated with the electronic system. The AC signals received by both detectors are quite similar. However, there is a time delay $\tau$ between corresponding points in the respective signals which corresponds to the traveling time of the fluid from the first detector to the second. Consequently, knowing the distance between the detectors, the inverse of $\tau$ can be used as a measure of the flow rate of the coolant within the pipe at that point. The measurement thus obtained is independent of the absolute or relative size of the two DC signals. Therefore, any drift in the measuring system will not affect the measurement. The signals obtained from the two detectors are cross-correlated to obtain $\tau$ which appears as the delay time of the peak in the cross-correlation function. The cross-correlation function may be obtained by using a computer or by varying the delay time of an electronic correlator. Thus, for a certain delay time $\tau$, proportional to the inverse of the flow rate, the cross-correlation function will reach its maximum. This delay time corresponds to the fluid transport time between the two detectors.

Both N-16 detectors can be surrounded by lead collimators to assure that the radiation only from a small portion of the fluid volume hits the detectors. This prevents any "smear out" of the peak of the cross-correlation function which might otherwise occur, making it impossible to determine $\tau$ accurately.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

In order to achieve the aforementioned objectives, this invention utilizes the statistical variation of the nitrogen 16 activity in the reactor coolant water for making flow rate determination. The flow is calculated based upon knowing the distance between two nitrogen 16 detectors spaced along the reactor coolant loop and determining the time which elapses for an activity pattern to travel from one detector to the other detector positioned downstream.

Nitrogen 16 is a gamma emitting isotope with a 7.35 second half-life. The gamma activity is induced from oxygen[16] by the bombardment of very fast neutrons (greater than 10 Mev). The gamma activity, at 6 Mev, is the principal radiation emitted from the primary coolant of a pressurized water reactor. The activity is produced in the reactor core by very fast fission neutrons acting upon the oxygen in the reactor water coolant.

Figure 5:
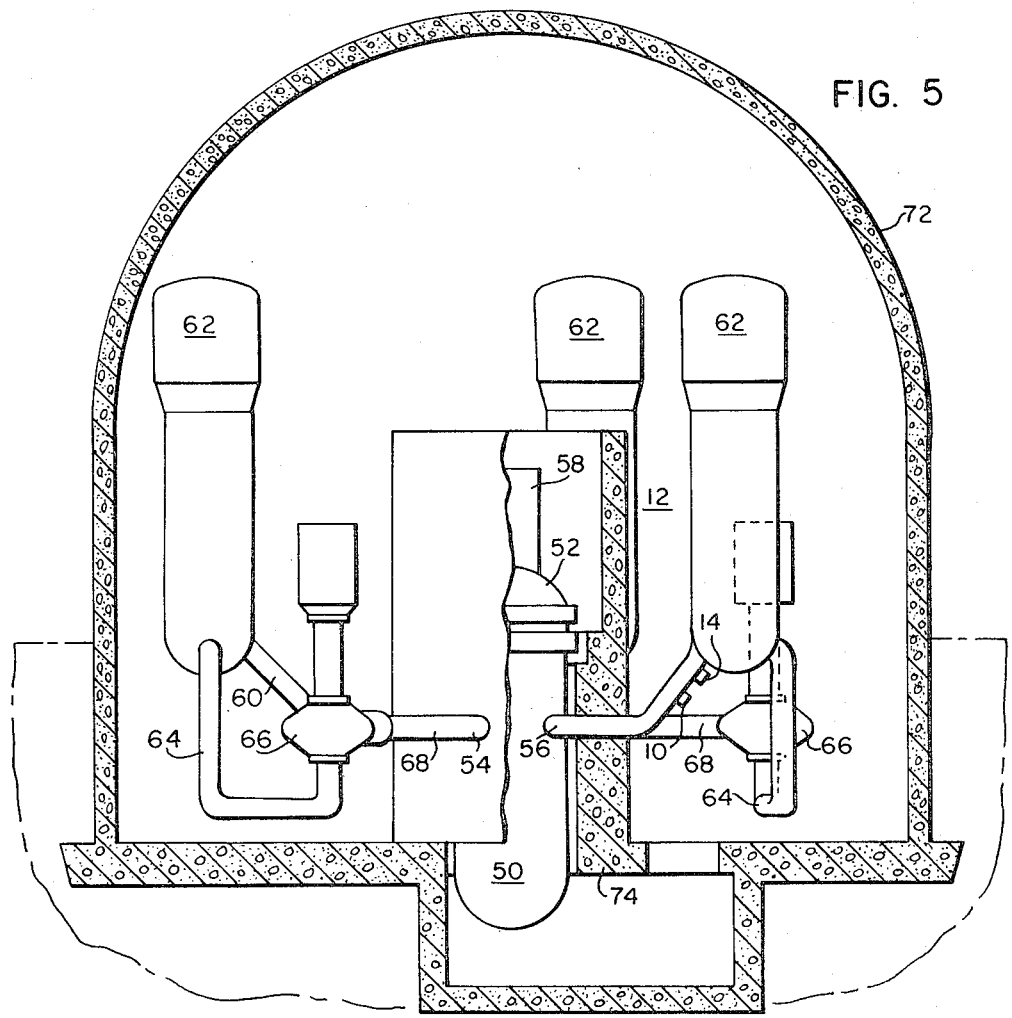
FIG. 5 is a side view, partially in section, of a nuclear stream generating system incorporating this invention.

Referring now to FIG. 5, there is illustrated a nuclear steam generating system of the pressurized water type incorporating the flow rate monitor of this invention. A pressurized vessel 50 is shown which forms a pressurized container when sealed by its head assembly 52. The vessel 50 has coolant flow inlet means 54 and coolant flow outlet means 56 formed integral with and through its cylindrical walls. As is known in the art, the vessel 50 contains a nuclear core (not shown) which generates substantial amounts of heat depending primarily upon the position of a control means; the pressure vessel housing 58 of which only is shown. The heat generated by the reactor core is conveyed from the core by the coolant flow entering through inlet means 54 and exiting through outlet means 56. After operation at power is achieved, the loss of such a coolant flow or other heat sustaining means would quickly melt the core structure.

The flow exiting through outlet means 56 is conveyed through hot leg conduit 60 to a heat exchange steam generator 62. The steam generator 62 is of a type wherein the heated coolant flow is conveyed through tubes (not shown) which are in heat exchange relationship with the water which is utilized to produce steam. The steam produced by generator 62 is commonly utilized to drive a turbine (not shown) for the production of electricity. The flow is conveyed from the steam generator 62 through conduit 64 to a pump 66 from which it proceeds through cooled leg conduit 68 to inlet means 54. Thus it can be seen that a closed recycling primary or steam generating loop is provided with the coolant piping, generically described by reference character 12, communicably coupling the vessel 50, the steam generator 62, and the pump 66. The generating system illustrated in FIG. 5 has three such closed fluid flow systems or loops. The number of such systems should be understood to vary from plant to plant, but commonly two, three or four are employed.

In the event of a break in one of the closed primary or steam generating systems, the capacity of all the primary systems to dissipate the heat produced by the nuclear core might be substantially impared possibly resulting in a melt down of the core structure and the release of dangerous fission products. In order to protect against this contingency and provide early protection of a loss of coolant flow this invention provides a flow rate monitoring system which will be explained in detail with regard to the description of FIG. 3. According to this invention, two nitrogen 16 detectors 10 and 14 are situated within the reactor containment structure 72 adjacent the coolant piping 12, but preferably outside of the reactor missile barrier 74. The nitrogen 16 detectors 10 and 14 are desirably placed along the hot leg conduit 60 upstream of the steam generator 62 so that the detectors are responsive to the nitrogen 16 activity in the coolant before the nitrogen 16 decays to a negligible level.

Figure 1:
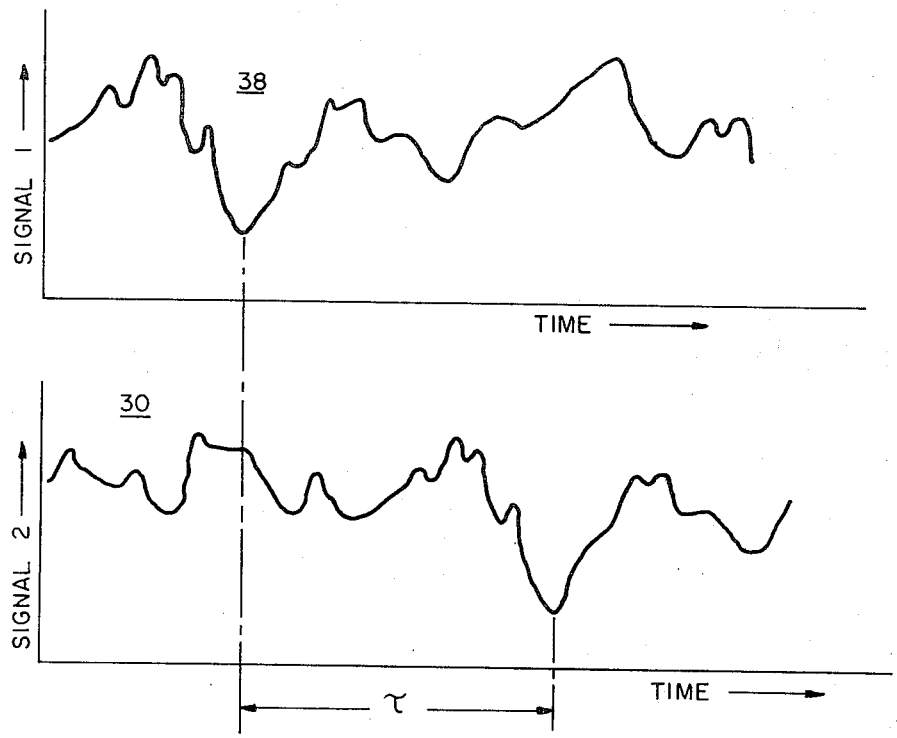
FIG. 1 is a graphical illustration of the signals that are received from the detectors of this invention.
Figure 3:
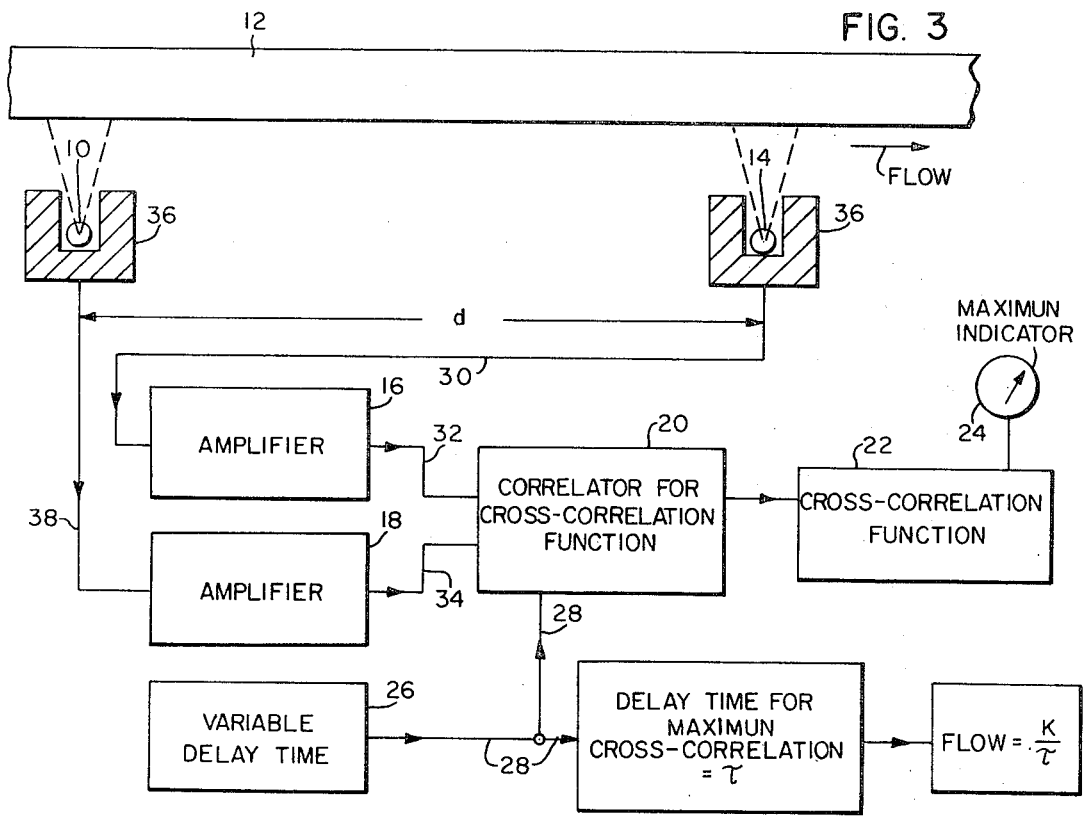
FIG. 3 is a schematic diagram of one embodiment of a system which may be employed to practice this invention.

FIG. 3 is a schematic diagram of an enlarged section of the coolant piping 12 shown in FIG. 5 illustrating an exemplary embodiment which may be employed to practice this invention. Two N-16 detectors 10 and 14 are illustrated which are responsive to the gamma rays emitted from the nitrogen 16 activity within the coolant loop piping 12. The detectors 10 and 14 are positioned substantially adjacent the coolant loop piping 12 with detector 10 positioned upstream of detector 14 and spaced at a distance d therefrom. Since the detectors are responsive to the delayed gamma signal emitted from the nitrogen 16 activity in the coolant, it is desirable to have these detectors positioned along the hot leg of the coolant loop so that they detect the gamma signals before the nitrogen 16 activity decays to a negligible level. Both detectors 10 and 14 encounter gamma signals having a DC component and a superimposed noise or AC component. The detector output signals 38 and 30 are graphically illustrated in FIG. 1. The AC component in the output signals thus shown, are attributed to local variations in the nitrogen 16 activity concentration in the coolant fluid and some stray noise in the electronic system. This invention utilizes the fact that the AC component of the output signals from detectors 10 and 14 are quite similar. It may be observed by reference to FIG. 1 that signal 30 shows a time delay $\tau$ with respect to signal 38 which corresponds to the traveling time of the fluid from the detector 10 location to the detector 14 location. Consequently, the inverse of $\tau$ is an indication of the coolant flow rate within the piping 12. Therefore, by measuring the delay time between common points in the two detector signals it is possible to determine this flow rate.

Figure 2:
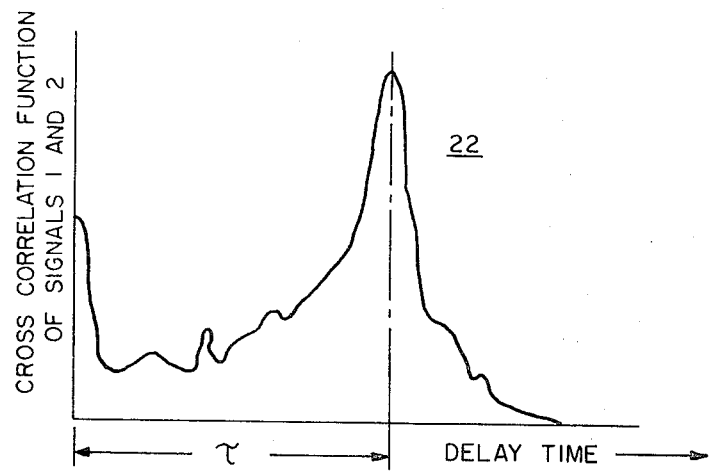
FIG. 2 is a graphical illustration of an exemplary cross-correlation function obtained from the signals illustrated in FIG. 1.

Using $\tau$ as an indication of the flow rate of the coolant provides a measurement which is independent of the absolute or relative size of the two DC signals received by the respective detectors 10 and 14. Therefore any drift in the measuring system does not affect the measurement of the fluid flow rate. In the embodiment illustrated as exemplary of this invention the respective signals 38 and 30 received from the detectors 10 and 14 are cross-correlated to obtain $\tau$ which appears as the delay time of the peak in the cross-correlation function. The cross-correlation function may be obtained by using a computer or by varying the delay time of an electronic comparator or correlator. An illustrative cross-correlation function obtained from the signals 38 and 30 illustrated in FIG. 1 may be found by reference to FIG. 2. An exemplary embodiment of a system which may be employed to obtain this cross-correlation function is illustrated in FIG. 3. Both of the nitrogen 16 gamma detectors illustrated in FIG. 3, which are located within the proximity of the coolant loop piping 12, are desirably surrounded by lead collimators 36 to assure that the radiation only from a small portion of the fluid volume within the piping 12 hits the detectors 10 and 14. This prevents any "smear out" of the peak of the cross-correlation function which might otherwise occur making it impossible to determine $\tau$ accurately.

Figure 4:
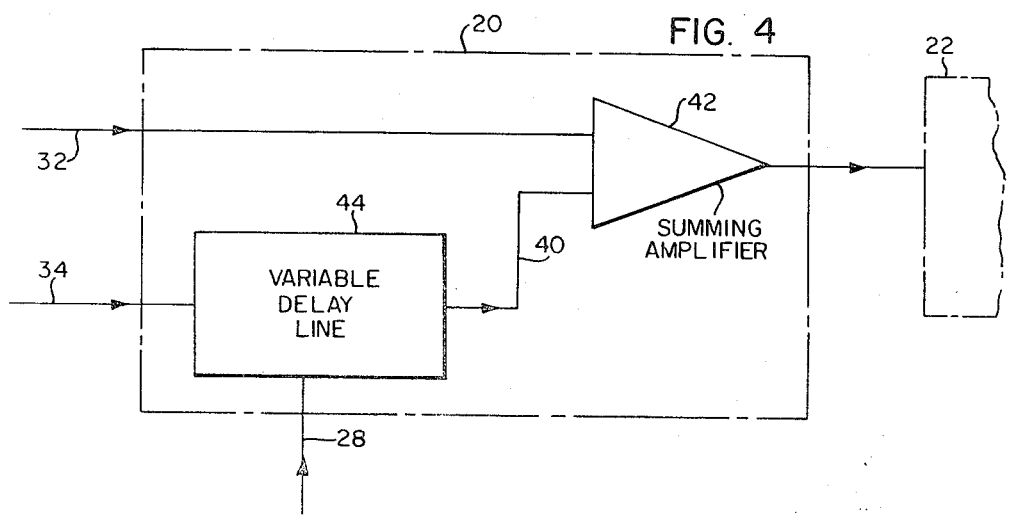
FIG. 4 is a schematic diagram of one embodiment of the correlator illustrated in FIG. 3.

The outputs 38 and 30 from the detectors 10 and 14, respectively, are fed into amplifiers 18 and 16 for amplification to obtain a suitable AC signal for correlation. The outputs 32 and 34 from the amplifiers 16 and 18, respectively, are connected to an electronic correlator 20 which will be described in more detail with referece to FIG. 4. The exemplary electronic correlator shown sums the two signals and produces a cross-correlation function 22. It should be understood that the electronic correlator 20 may be set up to provide an alternate arithmetic function, such as multiplication, to obtain the cross-correlation function 22, the output 34 from electronic amplifier 18 is connected to a variable delay line 44 as illustrated in FIG. 4. The delay time of the delay line 44 is controlled by controller 26, illustrated in FIG. 3, which adjusts the time delay 28 for the line 44. The outputs 40 from the delay line 44 and 32 from the amplifier 16 are fed through a summing amplifier 42 which sums the detector outputs and produces the cross-correlation function 22. By varying the delay time of the output 38 of detector 10, by means of the variable delay line 44, it is possible to maximize the output 22 of the summing amplifier 42. The delay time that produces the maximum cross-correlation 22 is the delay $\tau$. Thus by varying the delay time controller 26, until a maximum is indicated by the meter 24, it is possible to determine $\tau$ and thereby measure the flow rate within the coolant piping 12. All the components incorporated into the embodiment illustrated in FIGS. 3 and 4 are well known in the art and therefore have not been described in more detail. The maximum indicator 24 may be any current responsive device such as an ammeter. The inverse of $\tau$ multiplied by the distance between the detectors 10 and 14 gives the actual flow rate within the piping 12.

Thus, a system has been provided for accurately measuring the primary coolant flow rate in a nuclear reactor which is insensitive to any electronic drift in the measuring system.

We claim as our invention:

1. A system for measuring the rate of coolant flow within a coolant loop of a nuclear reactor which comprises:

a first detector responsive to the delayed gamma radiation emanating from the nitrogen 16 activity within the reactor coolant positioned substantially adjacent the coolant loop;

a second detector responsive to the delayed gamma radiation emanating from the nitrogen 16 activity within the reactor coolant and positioned substantially adjacent the coolant loop downstream of said first detector; and means for cross-correlating the signals received from said first and second detectors and delaying said first detector signal with respect to said second detector signal until said cross-correlation function reaches a maximum so as to determine the delay time between corresponding points in said first and second detector signals.

2. The apparatus of claim 1 wherein said first and second detectors are substantially surrounded by lead collimators assuring that the radiation from only a small portion of the coolant volume is received by said first and second detectors.

3. The apparatus of claim 1 wherein said correlating means comprises an electronic correlator.

4. The apparatus of claim 3 wherein said electronic correlator comprises:

a variable delay line having an input from said first detector and an output;

means for varying the delay time of said delay line so as to delay the output of said first detector with respect to time; and electrical means for arithmetically operating on said delay line output and said second detector output for determining the delay time between corresponding points in the signals received from said first and second detectors.

5. The apparatus of claim 4 wherein said electrical means comprises:

means for summing the outputs from said delay line and said second detector; and means for indicating the delay time that produces a maximum output from said summing means.

6. The apparatus of claim 1 wherein the reactor coolant loop has a hot and cold leg and said first and second detectors are positioned along the hot leg of said coolant loop.

7. A method of measuring the coolant flow rate within a coolant loop of a nuclear reactor comprising the steps of:

detecting the gamma radiation of irregularly fluctuating magnitude emanating from the nitrogen 16 activity within the reactor coolant at a first position along the reactor coolant loop;

detecting the gamma radiation of irregularly fluctuating magnitude emanating from the nitrogen 16 activity within the reactor coolant at a second position along the reactor coolant loop downstream of said first position;

correlating the fluctuating gamma radiation signals received from said first and second positions respectively; and determining the delay time between corresponding points in said fluctuating signals.

8. The method of claim 7 wherein said correlating step comprises the steps of taking the cross-correlation function of the signals received from said first and second positions, respectively, and said determining step comprises the step of delaying the signal received from said first position with respect to the signal received from said second position until said cross-correlation function is a maximum.

* * * * *